United States Patent
Betke et al.

(10) Patent No.: US 12,039,204 B2
(45) Date of Patent: *Jul. 16, 2024

(54) INFERRING THE STATE OF A WRITE-ONLY DEVICE BY MAPPING CONTROL REGISTER VALUES AND FEEDBACK SIGNAL VALUES

(71) Applicant: International Business Machines Corporation, Armonk, NY (US)

(72) Inventors: Jarrett Betke, Hoffman Estates, IL (US); George Russell Zettles, IV, Rochester, MN (US); Jeremy T Ekman, West Concord, MN (US); Austin Carter, Olmsted, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/363,102

(22) Filed: Aug. 1, 2023

(65) Prior Publication Data

US 2023/0384978 A1 Nov. 30, 2023

Related U.S. Application Data

(63) Continuation of application No. 17/077,705, filed on Oct. 22, 2020, now Pat. No. 11,762,584.

(51) Int. Cl.
*G06F 3/06* (2006.01)
*G06F 13/42* (2006.01)

(52) U.S. Cl.
CPC .......... *G06F 3/0659* (2013.01); *G06F 3/0604* (2013.01); *G06F 3/0653* (2013.01); *G06F 3/0673* (2013.01); *G06F 13/4282* (2013.01)

(58) Field of Classification Search
CPC .... G06F 3/0604; G06F 3/0653; G06F 3/0673; G06F 13/4282
See application file for complete search history.

(56) References Cited

U.S. PATENT DOCUMENTS

| | | |
|---|---|---|
| 7,138,820 B2 | 11/2006 | Goetting et al. |
| 7,148,828 B2 | 12/2006 | Fernandez et al. |
| (Continued) | | |

FOREIGN PATENT DOCUMENTS

| | | | |
|---|---|---|---|
| CN | 110082745 A * | 8/2019 | ............ G01S 13/02 |
| EP | 0 798 932 B1 | 10/1997 | |

OTHER PUBLICATIONS

Non-Final Office Action received for U.S. Appl. No. 17/077,705, dated Mar. 3, 2023, 23 pages.

(Continued)

*Primary Examiner* — Tammara R Peyton
(74) *Attorney, Agent, or Firm* — Amin, Turocy & Watson, LLP

(57) ABSTRACT

Techniques facilitating write-only device state inferences. In one example, a system can comprise a processor that executes computer executable components stored in memory. The computer executable components comprise: a monitor component; and a state component. The monitor component can compare a property of a feedback signal output by a write-only device with a reference signal. The state component can determine a state of the write-only device based on a comparison between the property and the reference signal.

20 Claims, 6 Drawing Sheets

(56) References Cited

U.S. PATENT DOCUMENTS

| | | |
|---|---|---|
| 7,355,536 B2 | 4/2008 | Dempsey et al. |
| 7,646,223 B2 | 1/2010 | Kim et al. |
| 8,284,888 B2 | 10/2012 | Kyles |
| 8,686,884 B2 | 4/2014 | Baumgartner et al. |
| 9,154,148 B2 | 10/2015 | Schafferer et al. |
| 10,007,561 B1 * | 6/2018 | Pudipeddi ............. G06F 9/5061 |
| 10,516,402 B2 | 12/2019 | Lindgren et al. |
| 11,625,198 B1 | 4/2023 | Gao |

OTHER PUBLICATIONS

Notice of Allowance received for U.S. Appl. No. 17/077,705 dated Jun. 14, 2023, 30 pages.
List of IBM Patents or Applications Treated as Related.

* cited by examiner

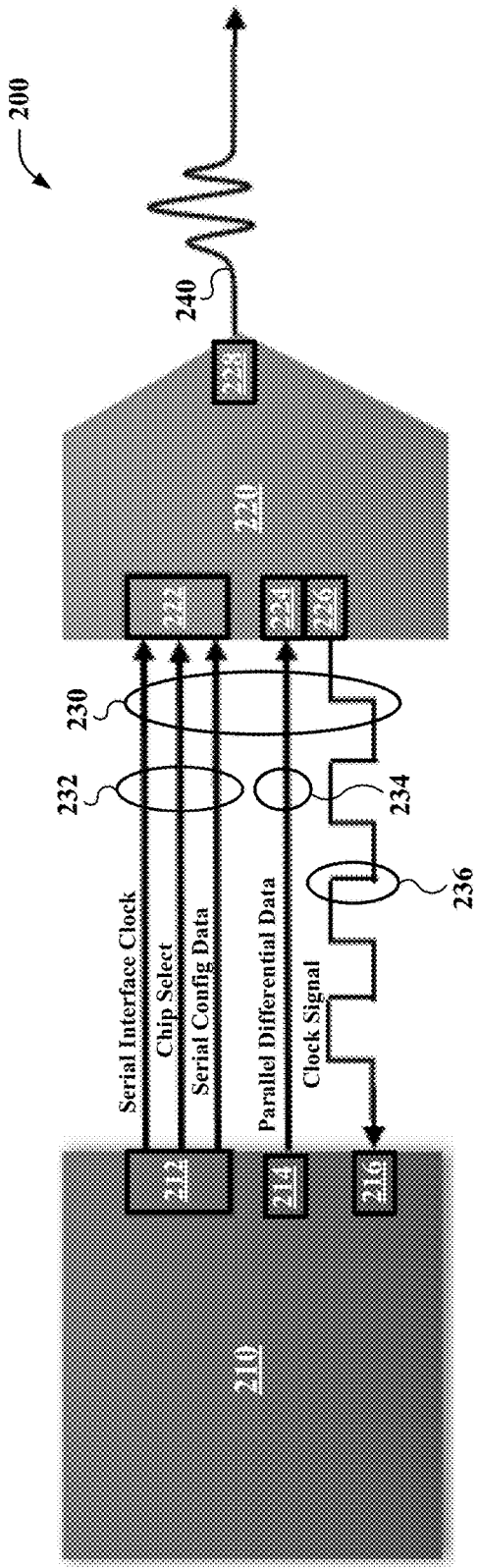
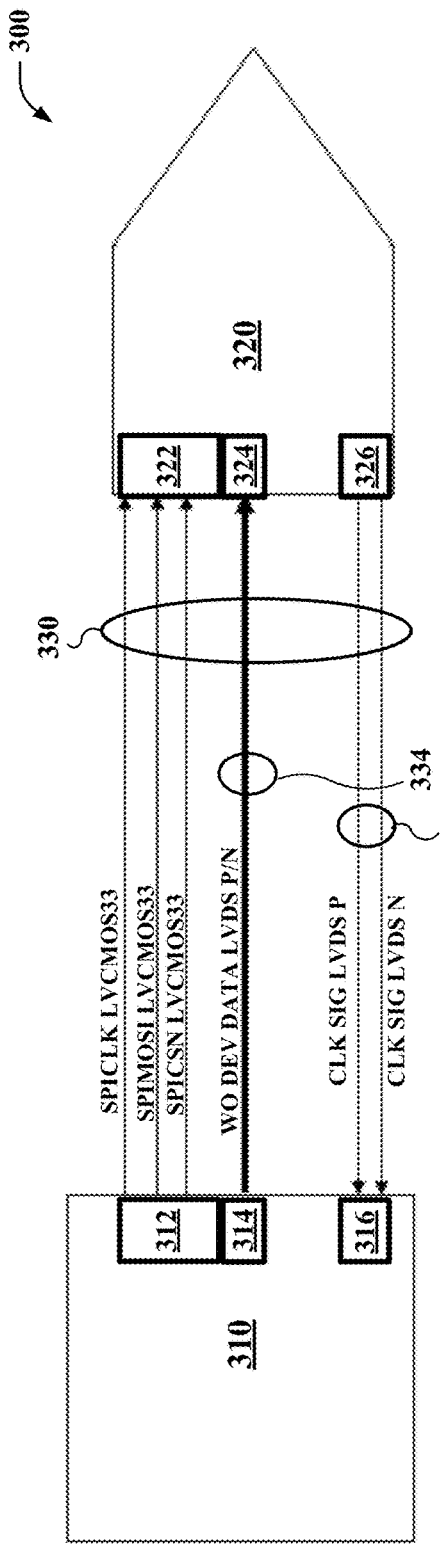
FIG. 2
FIG. 3

INFERRING THE STATE OF A WRITE-ONLY DEVICE BY MAPPING CONTROL REGISTER VALUES AND FEEDBACK SIGNAL VALUES

BACKGROUND

The subject disclosure relates to computing devices, and more specifically, to techniques of facilitating write-only device state inferences.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate inferring states of a write-only device are described.

According to an embodiment, a system can comprise a processor that executes computer executable components stored in memory. The computer executable components comprise: a monitor component; and a state component. The monitor component can compare a property of a feedback signal output by a write-only device with a reference signal. The state component can determine a state of the write-only device based on a comparison between the property and the reference signal.

According to another embodiment, a computer-implemented method can comprise comparing, using a processor, a property of a feedback signal output by a write-only device with a reference signal. The computer-implemented method can further comprise determining, using the processor, a state of the write-only device based on a comparison between the property of the feedback signal and the reference signal.

According to another embodiment, a computer program product can comprise a computer readable storage medium having program instructions embodied therewith. The program instructions are executable by a processor to cause the processor to perform operations. The operations include comparing a property of a feedback signal output by a write-only device with a reference signal. The operations further include determining a state of the write-only device based on a comparison between the property of the feedback signal and the reference signal.

DESCRIPTION OF THE DRAWINGS

FIG. 2 illustrates an example, non-limiting operating environment that is suitable for implementing aspects of one or more embodiments described herein.

FIG. 3 illustrates an example, non-limiting circuit topology of an interface for coupling field programmable devices with write-only devices, in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Write-only devices can be implemented in hardware applications that involve utilizing data to control or transfer information. As used herein, a "write-only device" refers to a device comprising an interface that permits external devices to set (or modify) data stored in one or more registers and/or memory locations of the device while precluding external devices from loading (or reading) data stored in those registers and/or memory locations. As used herein, a "read-only device" refers to a device comprising an interface that permits external devices to load (or read) data stored in one or more registers and/or memory locations of the device while precluding external devices from setting (or modifying) data stored in those registers and/or memory locations. As used herein, a "read-write device" refers to a device comprising an interface that permits external devices to both load (or read) data stored in one or more registers and/or memory locations of the device and set (or modify) data stored in those registers and/or memory locations.

Such devices can be designed to be "write-only" for various reasons, such as minimizing manufacturing costs, minimizing pin counts, meeting minimum functional requirements for a given system, minimizing latencies, and the like. In systems comprising a write-only device, it can be desirable to know if that device is operational or if that device is misconfigured. However, determining a state of a write-only device is generally unfeasible because external devices are precluded from loading (or reading) data stored in registers and/or memory locations of the write-only device. As such, techniques that facilitate inferring states of a write-only device are needed.

Figure 1:
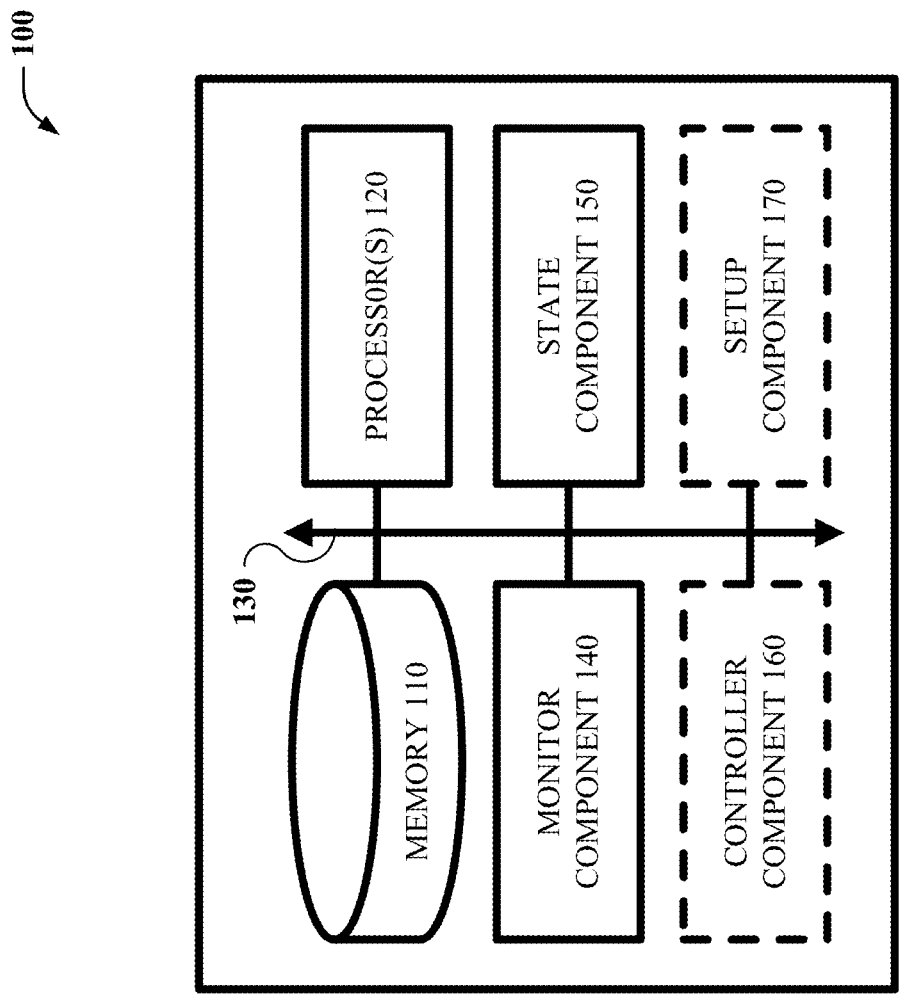
FIG. 1 illustrates a block diagram of an example, non-limiting system that can facilitate inferring states of a write-only device, in accordance with one or more embodiments described herein.

FIG. 1 illustrates a block diagram of an example, non-limiting system 100 that can facilitate inferring states of a write-only device, in accordance with one or more embodiments described herein. System 100 includes memory 110 for storing computer-executable components and one or more processors 120 operably coupled via one or more communication busses 130 to memory 110 for executing the computer-executable components stored in memory 110. As shown in FIG. 1, the computer-executable components include: monitor component 140; and state component 150.

Monitor component 140 can compare a property of a feedback signal output by a write-only device with a reference signal. In an embodiment, the feedback signal can be a programmable feedback clock signal. In an embodiment, the feedback signal can be a clock signal. In an embodiment, the feedback signal can be a data signal. For example, a write-only device can be implemented using an analog-to-digital converter. In this example, the feedback signal can be an output of the analog-to-digital converter. In an embodiment, the property of the feedback signal comprises: frequency, phase, amplitude, or a combination thereof. In an embodiment, the feedback signal can comprise information indicative of a state of a control register within the write-only device.

State component 150 can determine a state of the write-only device based on a comparison between the property and the reference signal. In an embodiment, the state of the write-only device can be an operational state when the comparison indicates that the property is within a predefined range of the reference signal. In an embodiment, the state of the write-only device can be an error state when the comparison indicates that the property is external to a predefined range of the reference signal.

In an embodiment, the computer-executable components stored in memory 110 can further include controller component 160. Controller component 160 can modify operation of the write-only device based on the state of the write-only device. In an embodiment, the computer-executable components stored in storage memory 110 can further include setup component 170. Setup component 170 can configure the write-only device via an interface coupling the setup component with the write-only device. In an embodiment, the interface can be a serial interface that couples the write-only device with a field-programmable gate array (FPGA) using an application specific communication protocol. The functionality of the computer-executable components utilized by the embodiments will be covered in greater detail below.

FIG. 2 illustrates an example, non-limiting operating environment 200 that is suitable for implementing aspects of one or more embodiments described herein. Operating environment 200 includes a field programmable device 210 coupled with a write-only device 220 via an interface 230. Example devices that are suitable for implementing field programmable device 210 include: an FPGA, a simple programmable logic device (SPLD), a complex programmable logic device (CPLD), an application-specific integrated circuit (ASIC), and the like.

Interface 230 comprises a serial peripheral interface (SPI) 232, a parallel data interface 234, and a clock interface 236. SPI 232 can be a three-line interface that couples output 212 of field programmable device 210 with input 222 of write-only device 220. Field programmable device 210 can digitally configure write-only device 220 by sending configuration information to write-only device 220 via SPI 232. In FIG. 2, that configuration information includes: a serial interface clock, a chip select signal, and serial configuration data.

In the embodiment of FIG. 2, write-only device 220 is implemented as a digital-to-analog converter. However, in other embodiments, write-only device 220 can be implemented as any write-only device with a programmable feedback clock. For example, write-only device 220 can be implemented as an analog-to-digital converter in an embodiment. In FIG. 2, field programmable device 210 can output parallel differential data via parallel data interface 234 that couples output 214 with input 224. Write-only device 220 can convert parallel differential data received at input 224 into analog data 240. Write-only device 220 can send analog data to other devices for further processing via output 228.

Write-only device 220 can register the configuration information that field programmable device 210 sends via SPI 232. To that end, write-only device 220 can set or load data into one or more control registers of write-only device 220 in accordance with the configuration information. Write-only device 220 can output a feedback signal via output 226 upon registering the configuration information. Field programmable device 210 can receive the feedback signal via clock interface 236 that couples output 226 with input 216. In an embodiment, the feedback signal is a programmable feedback clock signal. In an embodiment, the feedback signal output by write-only device 220 is based on a sampling clock signal that write-only device 220 receives from an external source. In an embodiment, the feedback signal comprises information indicative of a state of a control register within write-only device 220.

Since write-only device 220 is "write-only" external devices such as field programmable device 210 are precluded from loading or reading data stored in registers and/or memory locations of write-only device 210. As such, it can be generally unfeasible for field programmable device 210 to determine a state of write-only device 220 or a state of control registers within write-only device 220. For example, field programmable device 210 can be precluded from reading data stored in control registers of write-only device 220 to confirm that data set in the control registers conforms with configuration information sent by field programmable device 210. However, in one or more embodiments, field programmable device 210 can determine (or infer) a state of write-only device 220 or a state of control registers within write-only device 220 using the feedback signal received at input 216, as discussed in greater detail below.

FIG. 3 illustrates an example, non-limiting circuit topology 300 of an interface 330 for coupling field programmable devices with write-only devices, in accordance with one or more embodiments described herein. FIG. 3 generally shows that embodiments of the present disclosure can be implemented using custom interfaces with application specific communication standards. In FIG. 3, interface 330 comprises a SPI 332, a parallel data interface 334, and a clock interface 336. SPI 332 couples output 312 of field programmable device 310 with input 322 of write-only device 320 using a low-voltage complementary metal-oxide-semiconductor (CMOS) signal standard. Parallel data interface 334 couples output 314 of field programmable device 310 with input 324 of write-only device 320 using a low-voltage differential signal standard. Clock interface 336 couples input 316 of field programmable device 310 with output 326 of write-only device 320 using a low-voltage differential signal standard.

Figure 4:
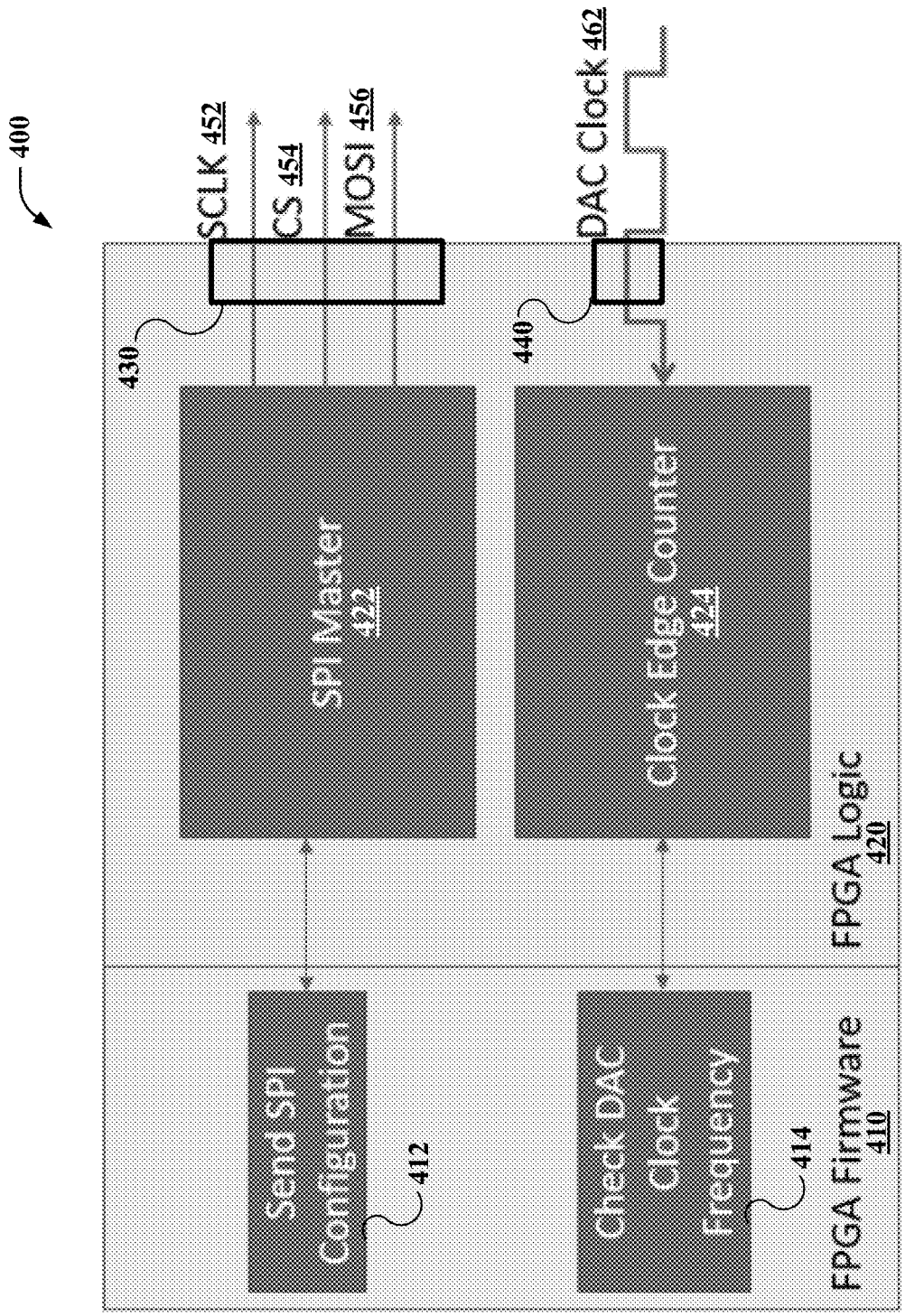
FIG. 4 illustrates a block diagram of an example, non-limiting FPGA, in accordance with one or more embodiments described herein.

FIG. 4 illustrates a block diagram of an example, non-limiting FPGA 400, in accordance with one or more embodiments described herein. In an embodiment, FPGA 400 can be used to implement field programmable devices 210 and/or 310 of FIGS. 2 and 3, respectively. As shown in FIG. 4, FPGA 400 includes FPGA firmware 410, FPGA logic 420, output 430, and input 440. FPGA 400 can be designed to configure a DAC or other write-only device via an interface (e.g., interfaces 230 and/or 330 of FIGS. 2-3, respectively) coupled to output 430. FPGA 400 can be further designed to determine (or infer) a state of the DAC or a state of control registers within the DAC using feedback signals received at input 440.

Figure 5:
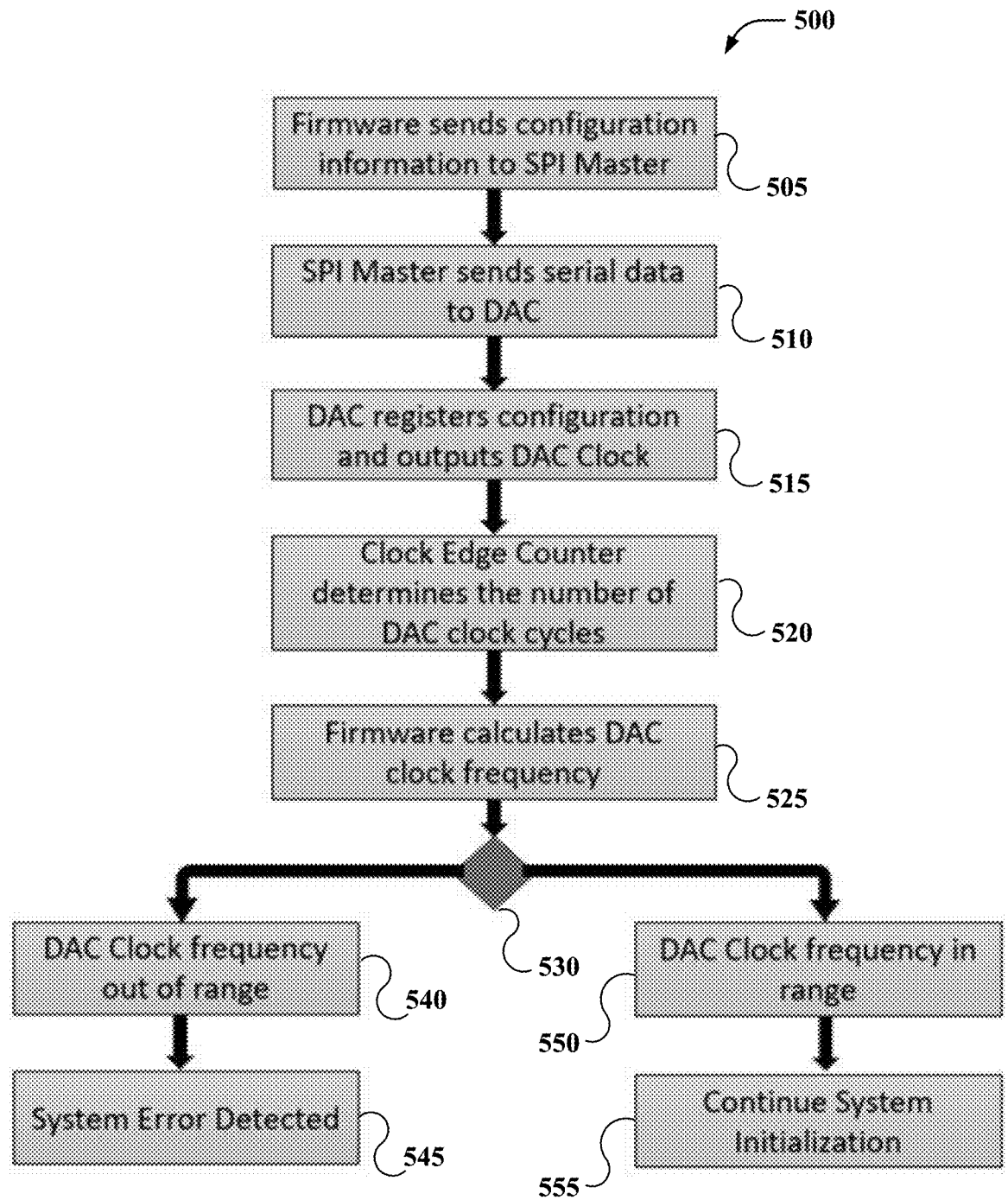
FIG. 5 illustrates an example, non-limiting operational flow for interacting with a write-only device, in accordance with one or more embodiments described herein.

FIG. 5 illustrates an example, non-limiting operational flow 500 that FPGA 400 of FIG. 4 can implement to interact with a DAC or other write-only device, in accordance with one or more embodiments described herein. At 505, firmware element 412 of FPGA firmware 410 can send configuration information to SPI master 422 of FPGA logic 420. At 510, SPI master 422 can send the configuration information to the DAC via an interface coupled to output 430. In an embodiment, sending the configuration information to the DAC can include SPI master 422 selecting the DAC by enabling a chip select (CS) signal 452. For example, SPI master 422 can enable the CS signal 452 to select the DAC by transitioning the CS signal 452 from a logic high to a logic low. In an embodiment, sending the configuration information to the DAC can include SPI master 422 sending a serial clock (SCLK) signal 454 to the DAC. In this embodiment, edges of the SCLK signal 454 can facilitate synchronizing the shifting and sampling of the communication information that SPI master 422 sends to the DAC. In an embodiment, the configuration information can be sent to the DAC as serial data encoded in a master out, slave in (MOSI) signal 456.

At 515, clock edge counter 424 of FPGA logic 420 receives a feedback signal at input 440 that the DAC sends responsive to setting one or more control registers with the configuration information sent by SPI master 422. In an embodiment, a frequency of the feedback signal is set by the DAC based on: one or more values stored in a control register of the DAC, a sampling clock signal that the DAC receives from an external source, or a combination thereof. In an embodiment, a frequency of the feedback signal is set using the function defined by Equation 1:

$$f_{dac} = \frac{f_{sample}}{2NMX}. \quad \text{Equation 1}$$

In accordance with Equation 1 above, $f_{dac}$ is a frequency of a feedback signal; $f_{sample}$ is a frequency of a sampling clock signal that the DAC receives from an external source; N is a multiplexer (MUX) ratio value stored in a control register of the DAC; M is a clocking mode (CM) ratio value stored in a control register of the DAC; and X is a clock division select (CDS) value. In an embodiment, N is a 1-bit value, M is a 2-bit value, and X is a 1-bit value.

At 520, clock edge counter 424 counts a number of cycles of the feedback signal that occur within a predefined period of time. At 525, firmware element 414 of FPGA firmware 410 calculates a frequency of the feedback signal using the number of cycles that clock edge counter 424 counted at 520. At 530, firmware element 414 performs a comparison between the feedback signal and a reference signal to determine a state of the DAC. For example, the reference signal can be an expected feedback signal frequency corresponding to a DAC configuration defined by the configuration information that the SPI master sent at 510. In this example, firmware element 414 can compare the frequency of the feedback signal to the expected feedback signal frequency.

In an embodiment, firmware element 414 can perform a comparison between the frequency of the feedback signal and a predefined range of a reference signal. In an embodiment, the predefined range of the reference signal can be defined by a lower frequency bound ($f_{lowerbound}$) and an upper frequency bound ($f_{upperbound}$) In an embodiment, $f_{lowerbound}$ and/or $f_{upperbound}$ can be defined based on: an expected frequency range, precision of clock edge counter 424, specification data for FPGA 400, or a combination thereof. In an embodiment, the comparison between the frequency of the feedback signal and the reference signal can be expressed using the following relationship: $f_{lowerbound} \leq f_{dac} \leq f_{upperbound}$ In this embodiment, the comparison indicates that the frequency of the feedback signal is within the predefined range of the reference signal when the preceding relationship is true. In this embodiment, the comparison indicates that the frequency of the feedback signal is external to the predefined range of the reference signal when the preceding relationship is false.

If the comparison at 530 indicates that the frequency of the feedback signal is external to the predefined range of the reference signal, operational flow 500 proceeds to 540. At 545, firmware element 414 can determine the state of the DAC to be an error state. The error state can be indicative of the DAC improperly setting the one or more control registers in accordance with the configuration information sent by SPI master 422 at 510. In an embodiment, FPGA 400 can modify operation of the DAC upon determining the state of the DAC to be the error state. For example, FPGA 400 can terminate operation of the DAC upon determining that the DAC is in the error state. In an embodiment, FPGA 400 can trigger a notification (e.g., a light or a user interface element) indicative of the DAC being in the error state.

Alternatively, if the comparison at 530 indicates that the frequency of the feedback signal is within the predefined range of the reference signal, operational flow 500 proceeds to 550. At 555, firmware element can determine the state of the DAC to be an operational state. The operational state can be indicative of the DAC properly setting the one or more control registers in accordance with the configuration information sent by SPI master 422 at 510. In an embodiment, FPGA 400 can modify operation of the DAC upon determining the state of the DAC to be the operational state. For example, FPGA 400 can continue a system initialization routine upon determining that the DAC is in the operational state. In an embodiment, FPGA 400 can trigger a notification (e.g., a light or a user interface element) indicative of the DAC being in the operational state.

In an embodiment, determining the state of the DAC includes accessing a mapping between control register values and feedback signal values. In an embodiment, the mapping between control register values and feedback signal values can reside in FPGA firmware 410. In an embodiment, the mapping between control register values and feedback signal values can reside in memory coupled with FPGA firmware 410. An example mapping between control register values and feedback signal values is shown below in Table 1. Table 1 generally provides ranges of control register values and a corresponding $f_{dac}$ given a fixed $f_{sample}$. In Table 1, a CM ratio value of "01" corresponds to the same DAC core speed as a CM ratio value of "10".

TABLE 1

| Mux Ratio N (1'b) | CM Ratio M (2'b) | CDS X (1'b) | $f_{dac}$ (MHz) |
|---|---|---|---|
| 0 | 00 | 0 | $f_{sample}/8$ |
|   |    | 1 | $f_{sample}/16$ |
|   | 10 | 0 | $f_{sample}/16$ |
|   |    | 1 | $f_{sample}/32$ |
|   | 11 | 0 | $f_{sample}/32$ |
|   |    | 1 | $f_{sample}/64$ |
| 1 | 00 | 0 | $f_{sample}/4$ |
|   |    | 1 | $f_{sample}/8$ |
|   | 10 | 0 | $f_{sample}/8$ |
|   |    | 1 | $f_{sample}/16$ |
|   | 11 | 0 | $f_{sample}/16$ |
|   |    | 1 | $f_{sample}/32$ |

Figure 6:
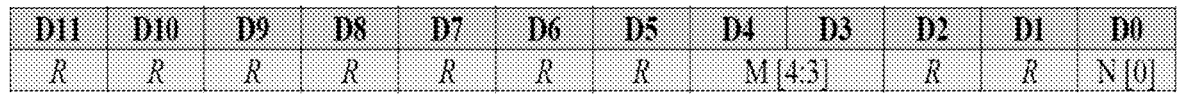
FIG. 6 illustrates an example, non-limiting control register, in accordance with one or more embodiments described herein.
Figure 7:
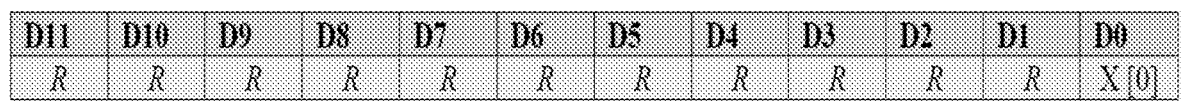
FIG. 7 illustrates another example, non-limiting control register, in accordance with one or more embodiments described herein.

FIGS. 6-7 illustrate example, non-limiting control registers, in accordance with one or more embodiments described herein. Specifically, FIG. 6 illustrates an example, non-limiting control register 600 comprising a MUX ratio value N and a CM ratio value M. FIG. 7 illustrates an example, non-limiting control register 700 comprising a CDS value X. In FIGS. 6-7, control registers 600 and 700 are each illustrated as 12-bit control registers. FIG. 6 shows the CM ratio value M being mapped to bits D4 and D3 of control register 600. FIG. 6 also shows the MUX ratio value N being mapped to bit D0 of control register 600. FIG. 7 shows the CDS value X being mapped to bit D0 of control register 700. All other bits lacking relevance for setting $f_{dac}$ in accordance with the example mapping of Table 1 are marked with R in FIGS. 6-7. FIGS. 6-7 show relevant bits for setting $f_{dac}$ in accordance with the example mapping of Table 1 as being distributed among two control registers (i.e., control registers 600 and 700). However, in other embodiments, such relevant bits can be included in a single control register or distributed among more control registers (e.g., three control registers).

In an embodiment, determining the state of the DAC can include inferring a value of a control register comprising the DAC. By way of example with respect to FIGS. 6-7, given the example mapping of Table 1 and a fixed $f_{sample}$ of 1 gigahertz (GHz), firmware element 414 can check if the frequency of the feedback signal calculated at 525 (counted $f_{dac}$ value) corresponds to any listed $f_{dac}$ values. In this example, if the counted $f_{dac}$ value is 250 megahertz (MHz)

$$\left(i.e., \frac{f_{sample}}{4}\right),$$

firmware element 414 can determine or infer that the DAC set the CM ratio value M, the MUX ratio value N, and the CDS value X to: "00"; "1"; and "0", respectively, as seen in Table 1. Alternatively, if the counted $f_{dac}$ value is 15.625 MHz $$\left(i.e., \frac{f_{sample}}{64}\right),$$

firmware element 414 can determine or infer that the DAC set the CM ratio value M, the MUX ratio value N, and the CDS value X to: "11"; "0"; and "1", respectively, as seen in Table 1.

In more complex instances, the counted $f_{dac}$ value may correspond to multiple listed $f_{dac}$ values. Continuing with the example above, if the counted $f_{dac}$ value is 125 MHz $$\left(i.e., \frac{f_{sample}}{8}\right),$$

that counted $f_{dac}$ value corresponds to three listed $f_{dac}$ values that are each associated with a different control register configuration, as seen in Table 1. In this instance, a first possibility is that the DAC set the CM ratio value M, the MUX ratio value N, and the CDS value X to: "00"; "0"; and "0", respectively. A second possibility is that the DAC set the CM ratio value M, the MUX ratio value N, and the CDS value X to: "00"; "1"; and "1", respectively. A third possibility is that the DAC set the CM ratio value M, the MUX ratio value N, and the CDS value X to: "01"; "1"; and "0", respectively.

In an embodiment, firmware element 414 can utilize the configuration information sent by SPI master 422 at 510 to select a likely control registration configuration from among a plurality of possible control register configurations. In an embodiment, firmware element can determine the state of the DAC to be an indefinite state upon determining that the counted $f_{dac}$ value corresponds to a plurality of possible control register configurations. In an embodiment, FPGA 400 can trigger a notification (e.g., a user interface element) indicative of the plurality of possible control register configurations.

In an embodiment, determining the state of the DAC to be an error state can include determining that a mismatch exists between listed $f_{dac}$ values in a mapping between control register values and feedback signal values and a counted $f_{dac}$ value. Continuing with the example above with respect to FIGS. 6-7, the example map of Table 1, and the fixed $f_{sample}$ of 1 GHz, the counted $f_{dac}$ value can be 200 MHz. In this instance, the counted $f_{dac}$ value does not correspond to any listed $f_{dac}$ value in the example map of Table 1, and thus firmware element 414 can determine that a mismatch exists.

In an embodiment, determining that the mismatch exists can involve identifying a closest listed $f_{dac}$ value in the mapping and determining that the counted $f_{dac}$ value deviates from the closest listed $f_{dac}$ value by more than a defined threshold. Continuing with the example above in which the counted $f_{dac}$ value is 200 MHz, firmware element 414 can identify 250 MHz as the closest listed $f_{dac}$ value in the example map of Table 1. Upon determining that the counted $f_{dac}$ value of 200 MHz deviates from 250 MHz by more than a defined threshold (e.g., 10%), firmware element 414 can determine that a mismatch exists and determine the state of the DAC to be an error state.

In an embodiment, firmware element 414 can implement one or more machine learned model(s) trained to determine a state of the DAC based on a property of a feedback signal and a reference signal. Any known artificial intelligence, machine learning, knowledge-based, or rule-based mechanisms can be used to train the one or more machine learned models using training data. Examples of such mechanisms include support vector machines, neural networks, expert systems, Bayesian belief networks, fuzzy logic, data fusion engines, classifiers, and the like. The training data can be obtained from data sets comprising historical feedback signal data.

Figure 8:
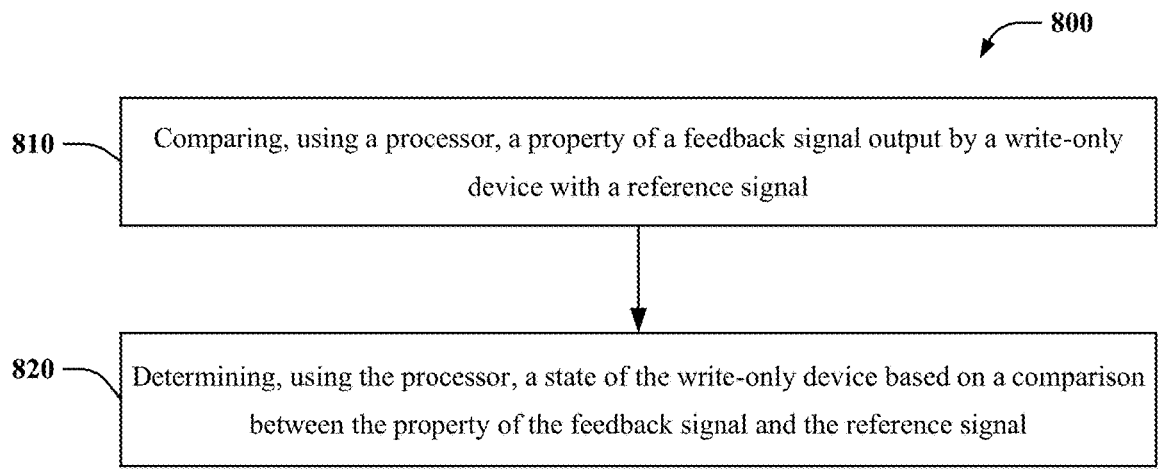
FIG. 8 illustrates a flow diagram of an example, non-limiting computer-implemented method of facilitating write-only device state inferences, in accordance with one or more embodiments described herein.

FIG. 8 illustrates a flow diagram of an example, non-limiting computer-implemented method 800 of facilitating write-only device state inferences, in accordance with one or more embodiments described herein. Repetitive description of like elements employed in other embodiments described herein is omitted for sake of brevity. At 810, the computer-implemented method 800 can comprise comparing, using a processor (e.g., with monitor component 140), a property of a feedback signal output by a write-only device with a reference signal. In an embodiment, the feedback signal is a clock signal. In an embodiment, the feedback signal is a programmable feedback clock signal. In an embodiment, the property of the feedback signal comprises: frequency, phase, amplitude, or a combination thereof. At 820, the computer-implemented method 800 can comprise determining, using the processor (e.g., with state component 150), a state of the write-only device based on a comparison between the property of the feedback signal and the reference signal.

In an embodiment, the write-only device can output the feedback signal responsive to setting a control register. In an embodiment, the control register can include: a multiplexer ratio value, a clocking mode ratio value, or a clock division select value. In an embodiment, the feedback signal output by the write-only device can be based on a sampling clock signal that the write-only device receives from an external source.

In an embodiment, determining the state of the write-only device can include: accessing a mapping between control register values and feedback signal values. In an embodiment, determining the state of the write-only device can include inferring a value of a configuration register comprising the write-only device.

In an embodiment, the computer-implemented method 800 can further comprise: continuing a system initialization routine when the comparison indicates that the property is within a predefined range of the reference signal. In an embodiment, the computer-implemented method 800 can further comprise: terminating operation of the write-only device when the comparison indicates that the property is external to a predefined range of the reference signal.

Figure 9:
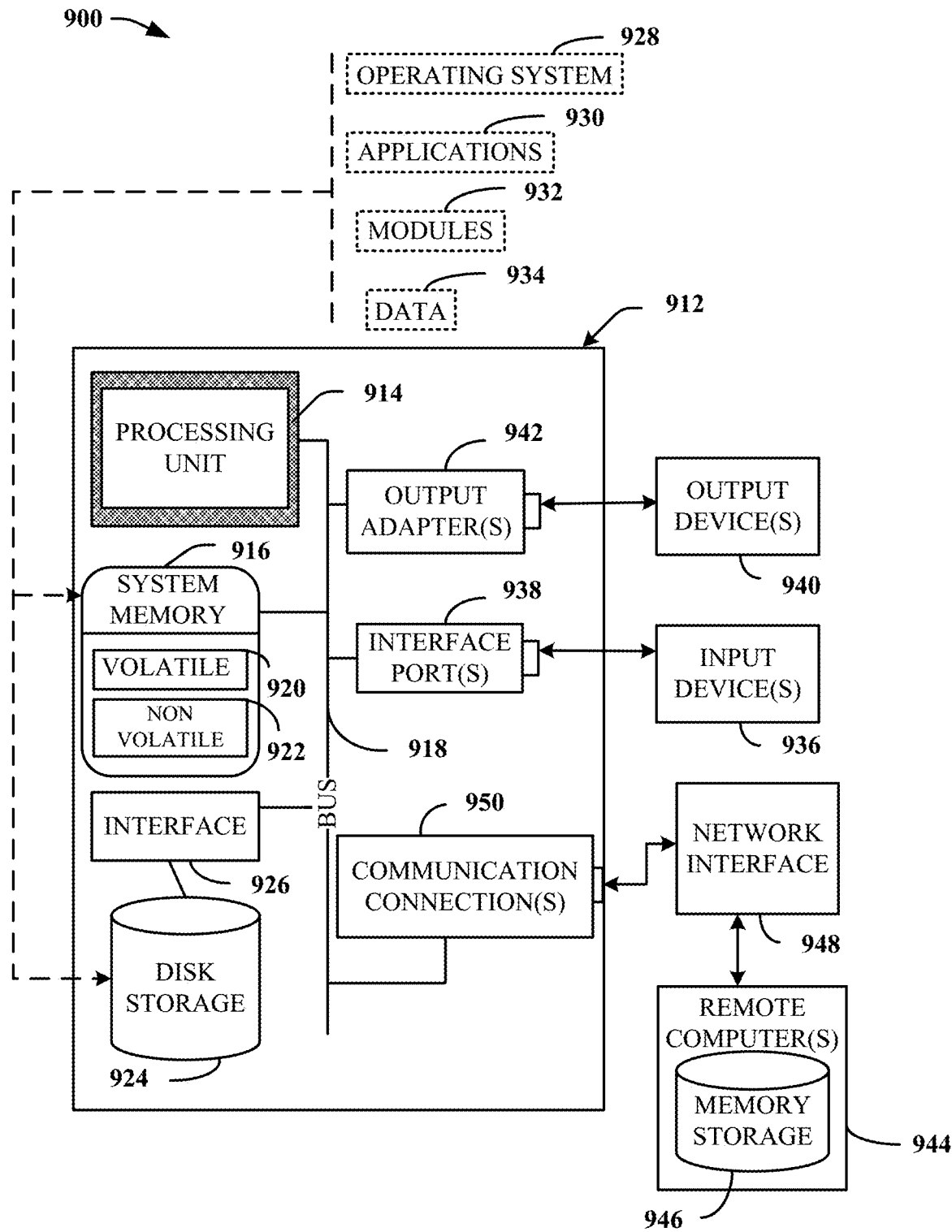
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/nonvolatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It can be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor-based appliance, a peer device or other common network node and the like, and typically can also include many or the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor; and
    a memory communicatively coupled to the processor, the memory having stored therein computer-executable instructions, comprising:
        a monitor component that compares a property of a feedback signal output by a write-only device with a reference signal, wherein the property of the feedback signal comprises information indicative of a state of a control register within the write-only device; and
        a state component that determines a state of the write-only device based on a comparison between the property of the feedback signal and the reference signal.

2. The system of claim 1, wherein the property of the feedback signal further comprises at least one of frequency, phase, or amplitude.

3. The system of claim 1, wherein the state component determines that the state of the write-only device is an operational state when the comparison indicates that the property of the feedback signal is within a predefined range of the reference signal.

4. The system of claim 1, wherein the state component determines that the state of the write-only device is an error state when the comparison indicates that the property of the feedback signal is external to a predefined range of the reference signal.

5. The system of claim 1, wherein the feedback signal is a programmable feedback clock signal.

6. The system of claim 1, further comprising:
    a controller component that modifies operation of the write-only device based on the state of the control register of the write-only device.

7. The system of claim 1, further comprising:
    a setup component that configures the write-only device via an interface coupling the setup component with the write-only device.

8. The system of claim 7, wherein the interface comprises a serial interface that couples the write-only device with a field-programmable gate array (FPGA) using an application specific communication protocol.

9. A computer-implemented method, comprising:
    comparing, by a system operatively coupled to a processor, a property of a feedback signal output by a write-only device with a reference signal; and
    determining, by the system, a state of the write-only device based on a comparison between the property of the feedback signal and the reference signal, wherein determining the state of the write-only device comprises:
        inferring a value of a control register of the write-only device.

10. The computer-implemented method of claim 9, wherein the write-only device outputs the feedback signal responsive to setting the control register.

11. The computer-implemented method of claim 10, wherein the control register stores at least one of a multiplexer ratio value, a clocking mode ratio value, or a clock division select value.

12. The computer-implemented method of claim 9, further comprising:
    continuing, by the system, a system initialization routine when the comparison indicates that the property of the feedback signal is within a predefined range of the reference signal.

13. The computer-implemented method of claim 9, further comprising:
    terminating, by the system, operation of the write-only device when the comparison indicates that the property of the feedback signal is external to a predefined range of the reference signal.

14. The computer-implemented method of claim 9, wherein the feedback signal output by the write-only device is based on a sampling clock signal that the write-only device receives from an external source.

15. A computer program product comprising a computer readable storage medium having program instructions embodied therewith, the program instructions executable by a processor to cause the processor to:
   compare a property of a feedback signal output by a write-only device with a reference signal, wherein the write-only device outputs the feedback signal responsive to setting a control register of the write-only device; and
   determine a state of the write-only device based on a comparison between the property of the feedback signal and the reference signal.

16. The computer program product of claim 15, wherein the feedback signal comprises information indicative of a state of the control register within the write-only device.

17. The computer program product of claim 15, wherein the program instructions are further executable by the processor to also cause the processor to:
   modify operation of the write-only device based on the state of the control register of the write-only device.

18. The computer program product of claim 15, wherein the program instructions are further executable by the processor to also cause the processor to:
   determine that the state of the write-only device is an operational state in response to the comparison indicating that the property of the feedback signal is within a predefined range of the reference signal.

19. The computer program product of claim 15, wherein the program instructions are further executable by the processor to also cause the processor to:
   determine that the state of the write-only device is an error state in response to the comparison indicating that the property of the feedback signal is outside of a predefined range of the reference signal.

20. The computer program product of claim 15, wherein the property of the feedback signal further comprises at least one of frequency, phase, or amplitude.

* * * * *